United States Patent [19]

Freeman

[11] E Patent Number: Re. 33,233

[45] Reissued Date of Patent: Jun. 12, 1990

[54] PORTABLE WOOD PROCESSING MACHINE

[76] Inventor: Floyd Freeman, R.R. 3, Cloverdale, Ind. 46120

[21] Appl. No.: 351,596

[22] Filed: May 15, 1989

Related U.S. Patent Documents

Reissue of:

[64] Patent No.: 6,854,956
Issued: Aug. 11, 1987
Appl. No.: 864,495
Filed: May 19, 1986

[51] Int. Cl.[5] ..... B27L 7/00

[52] U.S. Cl. ..... 144/3 K; 144/193 A; 144/366

[58] Field of Search ..... 144/3 K, 193 R, 193 A, 144/366

[56] References Cited

U.S. PATENT DOCUMENTS

| | | | |
|---|---|---|---|
| 1,001,272 | 8/1911 | Howard | 144/3 K |
| 3,862,651 | 1/1975 | Heikkinen | 144/3 K |
| 4,176,696 | 12/1979 | Greeninger | 144/3 K |
| 4,269,242 | 5/1981 | Smith et al. | 144/193 A |
| 4,371,019 | 2/1983 | Jeffrey | 144/3 K |
| 4,478,263 | 10/1984 | Johnston | 144/193 A |
| 4,609,018 | 9/1986 | Barker | 144/3 K |
| 4,641,694 | 2/1987 | Rohde | 144/3 K |

*Primary Examiner*—W. Donald Bray
*Attorney, Agent, or Firm*—Woodard, Emhardt, Naughton, Moriarty & McNett

[57] ABSTRACT

A machine for processing fallen trees into split logs. A mobile frame having wheels mounted thereto includes a wench having an extendable cable removably attachable to the fallen tree. The cable extends through a chute to enable the fallen trees to be pulled therethrough. A hydraulically driven saw pivotally mounted at the end of the chute is operable to cut off portions of the fallen tree. The cut-off portion rests atop a ramp which has an inclined surface allowing the cut-off portion to be rolled into a splitter. The splitter includes a hydraulically operated ram slidably mounted in a secondary frame mounted atop the main frame of the machine. The ram is moveable towards a pair of intersecting stationary cutting blades for splitting the cut-off portion of the tree into split logs.

15 Claims, 5 Drawing Sheets

PORTABLE WOOD PROCESSING MACHINE

Matter enclosed in heavy brackets [ ] appears in the original patent but forms no part of this reissue specification; matter printed in italics indicates the additions made by reissue.

BACKGROUND OF THE INVENTION

This invention is in the field of machines for processing trees into firewood. A number of machines have been provided to cut down trees and to remove limbs from the trees. Additional machines have been provided to cut timber into individual logs. Log splitters are also available to divide or split logs into smaller pieces. A major disadvantage of many of the prior machines is the requirement that the machines be manned by several persons. Further, many of the machines are difficult to move into forests which typically are quite congested with fallen trees, stumps, bushes, etc. Many fallen trees are located in ravines or other inaccessible areas increasing the difficulty of processing the fallen tree into split lumber. Disclosed herein is a tree processing machine which is readily moved into a forest and is operable by a single person in such a manner that the fallen tree is completely processed into split logs. Means are provided to pull fallen trees located in inaccessible locations to the tree processing machine.

An example of a machine for cutting portions off of a standing tree by means of an extendable arm is shown in U.S. Pat. No. 3,529,640, issued to Kamner. Another approach is to sever the base of the tree which is then placed in a wagon such as shown in U.S. Pat. No. 4,455,522, issued to Hyde, et al. A device for cutting down a tree and then moving along the length thereof to sever the branches of the fallen tree is shown in U.S. Pat. No. 3,340,912, issued to Williams, et al. Both the Williams, et al. patent and the aforementioned Hyde, et al. patent may be moved into a wooded area to harvest trees. Various devices have been provided for grasping lumber which is then processed such as shown in the U.S. Pat. Nos. 4,116,249, issued to Hogberg, et al., 4,273,168, issued to Probst, and 4,434,827, issued to Franklin.

Another disadvantage of the prior art devices is the relatively short device life due to the pounding and forces exerted on the device by the various moving components. The present device includes a ram for splitting the logs into smaller pieces. The ram is and cutting edges are mounted on a secondary frame which is mounted upon the main frame to isolate the ramming forces from the main frame. In addition, the cutting edges are arranged to intersect centrally with respect to the log and are positioned to not initially simultaneously engage the log thereby minimizing the amount of ramming force needed to split the log.

SUMMARY OF THE INVENTION

One embodiment of the present invention is a machine for processing fallen trees into split logs comprising frame means including wheels mounted thereto and further including a main frame supported by the wheels upon ground allowing the frame to be moved into a forest, a chute mounted on the frame and including an entrance to receive a fallen tree, pulling means mounted to the frame and operable to removably attach to the fallen tree and pull same through the entrance and into the chute, saw means movably mounted to the frame and operable to cut off a portion of the fallen tree positioned in the chute, a ramp on the frame positioned adjacent the chute to direct the cut-off portion away from the chute, and, splitting means mounted on the frame and operable to receive the cut-off portion from the ramp and split the cut-off portion into split logs.

Another embodiment of the present invention is a machine for processing fallen trees located remotely therefrom into split logs comprising a mobile main frame allowing the frame to be moved into a forest, chute means on the frame to receive a fallen tree, a wench mounted to the frame including a cable to removably attach to the fallen tree located remotely from the machine and pull the tree into the chute means, saw means movably mounted to the frame and operable to cut off a portion of the fallen tree positioned in the chute means, and, splitting means mounted on the frame and operable to receive the cut off portion and split the cut-off portion into split logs.

It is an object of the present invention to provide a mobile machine for processing fallen trees into split logs.

A further object of the present invention is to provide a machine which may be moved into a wooded area having means thereon for pulling fallen trees out of ravines and then processing the same into split logs.

In addition, it is an object of the present invention to provide a machine for processing fallen trees into split lumber which requires only one person to operate.

Related objects and advantages of the present invention will be apparent from the following description.

DESCRIPTION OF THE PREFERRED EMBODIMENT

Figure 1:
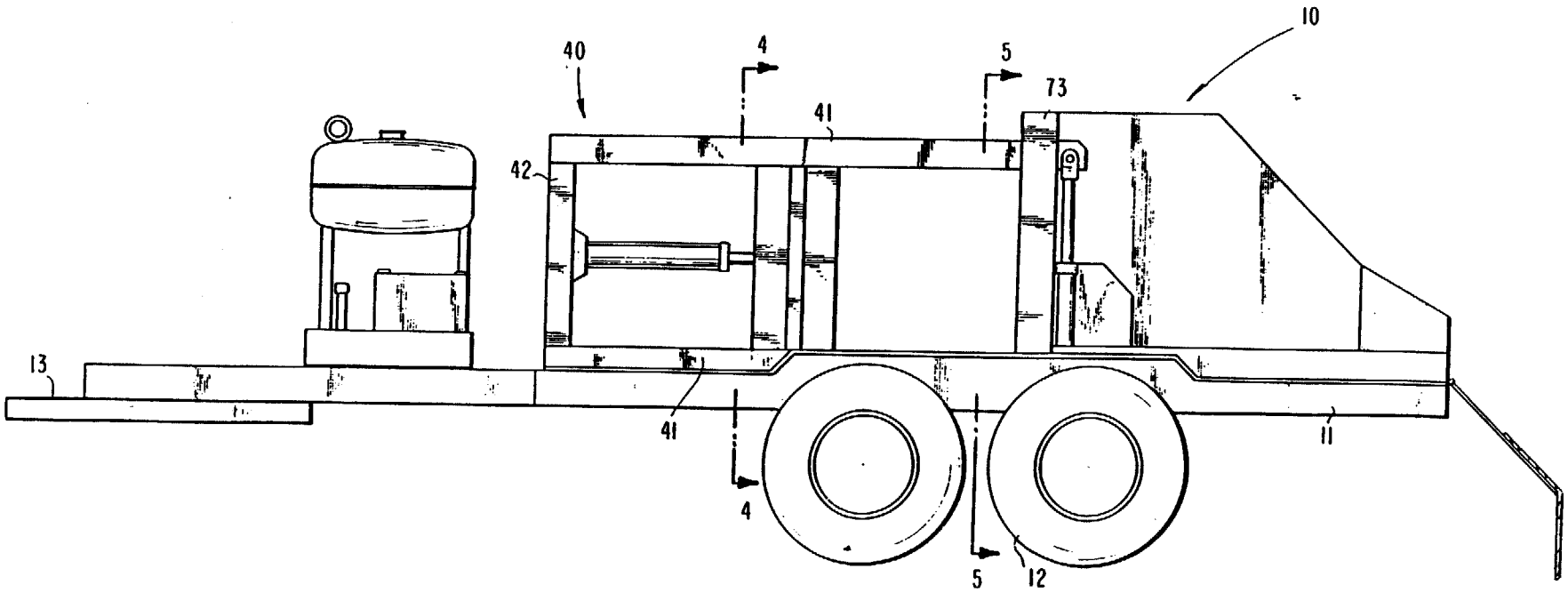
FIG. 1 is a side view of the machine for processing fallen trees incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
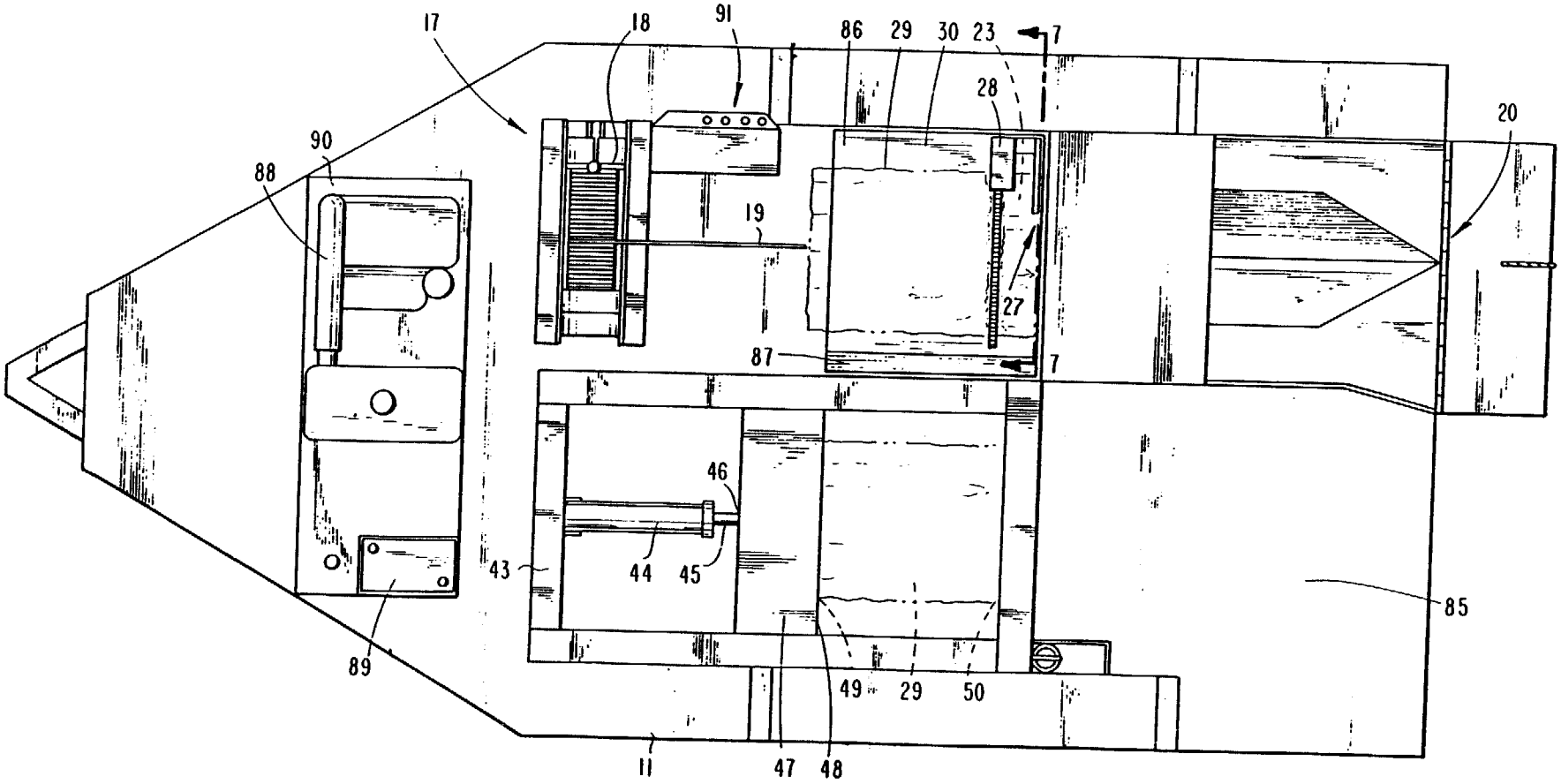
FIG. 2 is a top view of the machine of FIG. 1.
Figure 3:
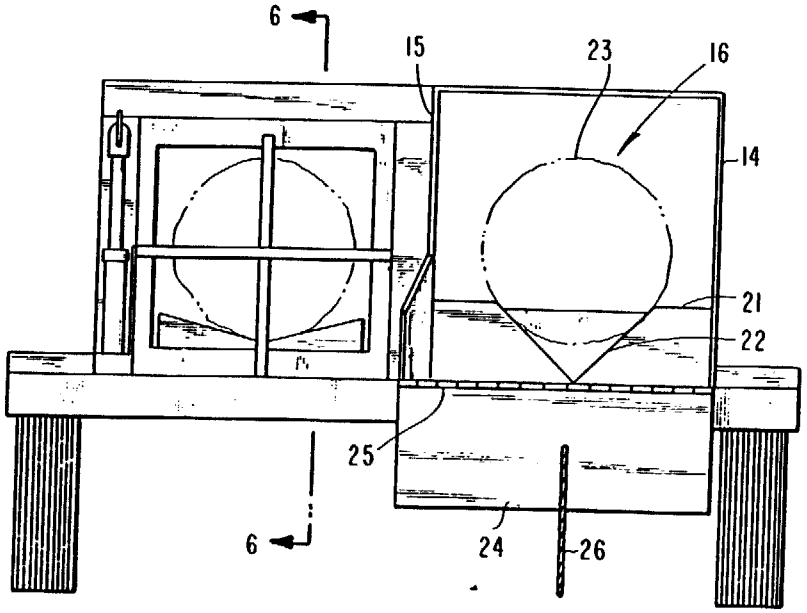
FIG. 3 is a right hand end view of the machine of FIG. 1.

Referring now more particularly to FIG. 1, there is shown a mobile machine 10 for processing fallen trees into split logs. Machine 10 includes a conventional main frame 11 having a plurality of wheels 12 rotatably mounted thereto and a trailer hitch 13 attached to one end of the main frame for pulling or moving machine 10 into a wooded area. Fixedly mounted atop frame 11 is a pair of vertically mounted side walls 14 and 15 (FIG. 3) which form a chute 16 to receive the fallen tree 23. A wench 17 (FIG. 2) is provided having a spool 18 rotatably mounted atop frame 11 and includes a cable 19 wound thereon. The free end of cable 19 is extended through chute 16 and attached to the fallen tree with the wench then being activated to rewind the cable and pull the fallen tree through the entrance 20 of the chute. The bottom wall 21 of chute 16 has a concave center portion 22 nestably receiving the fallen tree 23. A tail gate 24 is pivotally mounted by conventional hinge 25 to frame 11 and is moveable from an upward, closed position extending across entrance 20 to a downward, open position beneath the entrance as shown in FIG. 3 to provide a guide for the tree being pulled into the chute. A cable 26 or other conventional fastening means is provided on gate 24 to allow the gate to be locked in the upward position. Bottom wall 21 of the chute is inclined extending slightly upwardly from gate 24 to the exit opening 27 of the chute.

A hydraulically operated saw 28 is pivotally mounted to frame 11 immediately adjacent the exit opening 27 of the chute. As wench 17 pulls the fallen tree partially through exit opening 27 of the chute, saw 28 may be pivoted downward thereby engaging and severing a portion 29 of the tree. A ramp 30 is mounted atop frame 11 immediately adjacent saw 28 to support the cut-off portion 29 of the tree.

Figure 7:
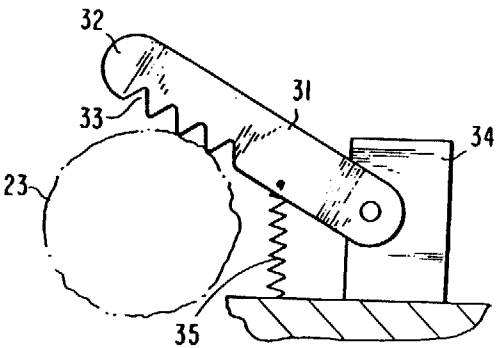
FIG. 7 is a enlarged fragmentary cross-sectional view taken along the line 7—7 of FIG. 2 and viewed in the direction of the arrows.

A holding member 31 (FIG. 7) is provided to releasably engage and hold fallen tree 23 while saw 28 severs the cut-off portion 29 from the tree. The holding means includes a plate 32 with a bottom serrated edge 33 pivotally mounted to block 34 affixed to frame 11. A spring 35 normally urges the member 32 downwardly to engage and hold fallen tree 23, but is releasable to allow the member to be manually pulled upward when the wench pulls the tree further through the chute.

Figure 5:
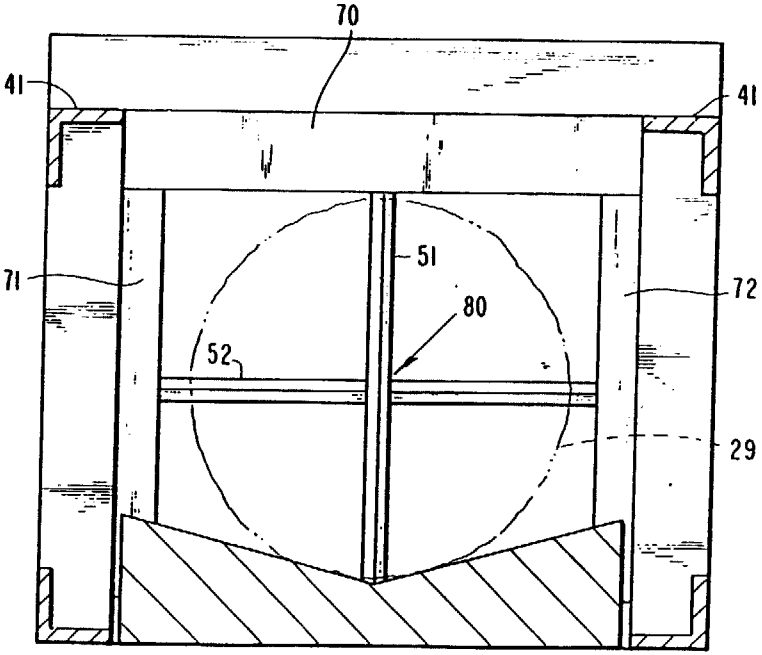
FIG. 5 is an enlarged cross-sectional view taken along the line 5—5 of FIG. 1 and viewed in the direction of the arrows.

Once the cut-off portion has been severed from the fallen tree, it is moved to a splitting means which is operable to receive the cut-off portion from ramp 30 and split the cut-off portion into split logs. The splitting means is mounted on a second frame and includes a hydraulically driven ram which forces the cut-off portion of the fallen tree past a pair of cutting edges thereby splitting the cut-off portion into split logs. The secondary frame isolates the horizontal compression force generated by the hydraulic ram from the main frame 11 thereby providing for a structurally sound machine. The secondary frame 40 includes a plurality of horizontally extending members 41 integrally connected together. Further, a plurality of vertically extending members 42 are integrally connected to cross-members 43 and members 41. The entire secondary frame 40 is securely fastened and mounted atop frame 11. Cantileveredly mounted to cross-member 43 is a hydraulic cylinder 44 having an extendable piston rod 45 with a distal end 46 attached to a ram 47. The ram has a contact surface 48 on the side opposite of the hydraulic cylinder which will contact end 49 of cut-off portion 29. The opposite end 50 of the cut-off portion engages a vertical cutting member 51 and a horizontal cutting member 52 (FIG. 5). Further extension of the piston rod forces the cut-off portion past cutting members 51 and 52 thereby splitting the cut-off portion into individual logs.

Figure 4:
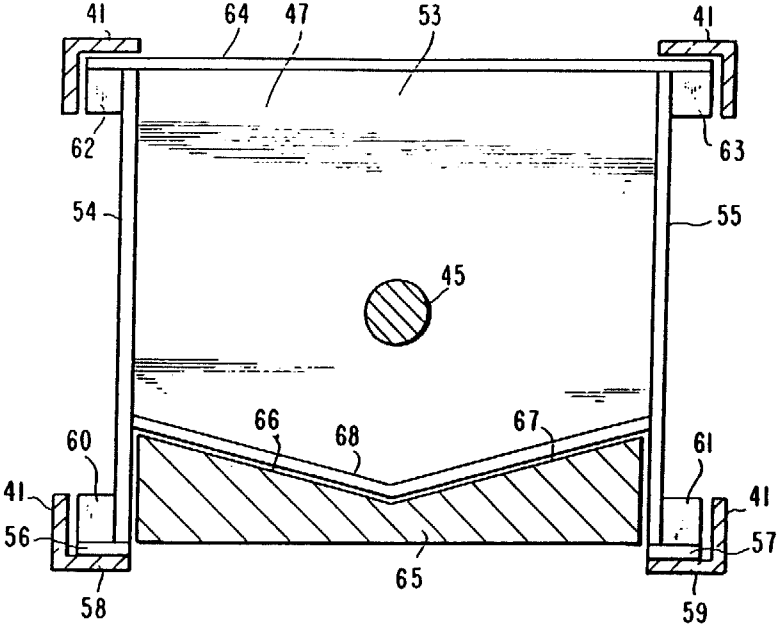
FIG. 4 is an enlarged cross-sectional view taken along the line 4—4 of FIG. 1 and viewed in the direction of the arrows.

Ram 47 has a vertically extending plate 53 (FIG. 4) fixedly secured to and between a pair of upright members 54 and 55 having outward turned legs 56 and 57 secured thereto. Legs 56 and 57 are slidably mounted atop the inward turned legs 58 and 59 of bottom horizontally extending L-shaped members 41. A pair of bars 60 and 61 are fixedly secured to upright members 54 and 55 to provide structural rigidity. The inward turned portions 58 and 59 provide a pair of rails upon which the ram may slide as the hydraulic cylinder extends and retracts its piston rod. A second pair of bars 62 and 63 are fixedly secured to the top portion of upright members 54 and 55 adding further structural rigidity. An upper member 64 is integrally mounted atop plate 53 and is positioned immediately beneath the inward turned portions of top horizontally extending members 41.

The floor of the splitting means includes a block 65 fixedly secured to frame 11 and having a pair of upwardly facing inclined surfaces 66 and 67 which intersect beneath piston rod 45 forming an upwardly facing concave seating area to receive the cut-off portion and to horizontally center the cut-off portion with respect to the intersection of cutting members 51 and 52 which cross vertically above the intersection of surfaces 66 and 67. The bottom edge 68 of plate 53 is spaced apart from surfaces 66 and 67, but is a mirror image thereof. Surfaces 66 and 67 form an upwardly facing V-shaped depression.

Figure 6:
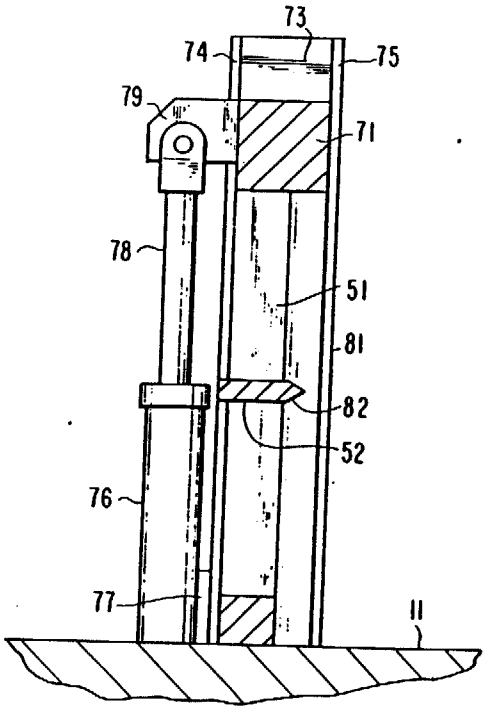
FIG. 6 is an enlarged fragmentary cross-sectional view taken along the line 6—6 of FIG. 3 and viewed in the direction of the arrows.

Cutting edges 81 and 82 are provided, respectively, on vertical member 51 and a horizontal member 52 having their opposite ends integrally connected to a vertically moveable cutting edge holder 70 (FIG. 5). Holder 70 includes a pair of vertically extending edge portions 71 and 72 (FIG. 5) which are slidably mounted within the edge flange portions of a pair of upright members 73 (FIG. 6) fixedly mounted to horizontally extending members 41 directing horizontal ramming force into frame 40 and not frame 11. For example, edge portion 71 is slidably positioned between flanges 74 and 75 of upright member 73. A hydraulic cylinder 76 has a bottom end fixedly mounted by conventional brackets 77 to member 73. The extendable piston rod 78 is mounted to an outwardly extending bracket 79 fixed to edge portion 71 of holder 70. Thus, extension and retraction of piston rod 78 will center the intersection 80 (FIG. 5) of cutting edges 51 and 52 relative to the vertical center of cut-off portion 29.

Cutting members 51 and 52 each have a sharp edge facing the ram contact surface 48. The cutting edge 81 (FIG. 6) of cutting member 51 is positioned closer to the ram contact surface 48 than the cutting edge 82 of the horizontally cutting member 52. Thus, vertical cutting edge 81 will first contact and initiate a split in the cut-off portion of the tree prior to edge 82 engaging the cut-off portion. Thus, less pressure is required to split the log into several pieces. The split logs then fall into a storage area 85 (FIG. 2) positioned in the aft section of the frame immediately behind the splitting means. Holder 70 may be disconnected from piston rod 78 and moved upwardly disengaging the upright members 73 and allowing the cutting blades to be sharpened.

Ramp 30 is aligned with floor 65 of the splitting means to enable the operator to manually push the cut-off portion 29 resting atop the horizontally extending portion 86 of the ramp down an inclined surface 87 of the ramp with cut-off portion then rolling down surface 66 (FIG. 4) and being horizontally centered relative to intersection 80 of the cutting members. Intersection 80 is horizontally centered relative to piston rod 45 and the intersection of surfaces 66 and 67. Hydraulic cylinder 76 may then be activated raising or lowering the cut-off portion 29 to vertically center the log relative to intersection 80.

Conventional hydraulic means and controls are provided for the operation of wench 17, saw 28 and hydraulic cylinders 44 and 76. A power source 88 such as an engine provided with a conventional battery 89 is mounted atop frame 11 and is connected to a supply of hydraulic liquid 90 for the pressurization thereof. Conventional conduits extend from supply 90 to the hydraulic motors attached to the wench and saw. Further, additional conventional conduits are provided for routing the pressurized hydraulic liquid to the pair of hydraulic cylinders 44 and 76. A valve control board 91 is provided to control the flow of hydraulic liquid for the activation of the wench, saw and hydraulic cylinders.

The present invention provides many advantages. First, the cable of the wench may be extended through the chute and removably attached to a fallen tree located remotely from the machine. The fallen tree may be in a ravine or other inaccessible location. Thus, by rewinding the cable attached to the fallen tree, the tree may be pulled toward the chute and eventually into the chute engaging the saw. A further advantage is that the entire machine may be operated by a single person allowing complete processing of a tree from a fallen state to the split log state. The particular structural arrangement of the various components is designed to add stability and strength to the machine thereby providing a long machine life. That is, the ram splitting means is designed in such a manner to isolate the horizontally generated compression forces from the remaining portion of the machine. Further, the splitting edges are intersected and moveable in such a manner to align the cutting edge intersection with the center of the log to be split.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A machine for processing fallen trees into split logs comprising:

frame means including wheels mounted thereto and further including a main frame supported by said wheels upon ground allowing said frame to be moved into a forest;

a chute mounted on said main frame and including an entrance to receive a fallen tree;

pulling means mounted to said main frame and operable to removably attach to said fallen tree and pull same through said entrance and into said chute;

saw means movably mounted to said main frame and operable to cut off a portion of said fallen tree positioned in said chute;

a ramp on said main frame positioned adjacent said chute to direct the cut-off portion away from said chute; and, splitting means mounted on said main frame and operable to receive said cut-off portion from said ramp and split said cut-off portion into split logs, said splitting means including;

cutting means and ramming means mounted on said main frame with said ramming means being operable to contact one end of said cut-off portion received from said ramp and force the opposite end of said cut-off portion against said cutting means splitting said cut-off portion into split logs; and a secondary frame fixedly mounted on said main frame with said ramming means and said cutting means mounted to said secondary frame which isolates pressures exerted by said ramming means against said cutting means from said main frame;

wherein said secondary frame includes a plurality of horizontally extending members interconnected together to form a plurality of horizontally extending rails, said ramming means includes a power cylinder with an extendable piston rod and a contact surface located distally on said piston rod to engage one end of said cut-off portion and apply horizontal force thereagainst, said contact surface is supported slidably upon said rails to move to and from said cutting means, said main frame further includes a V-shaped supporting surface to receive said cut-off portion from said ramp to horizontally align said cut-off portion resting thereatop with said cutting means, said power cylinder and said cutting means are mounted to said horizontally extending members thereby absorbing said horizontally extending force applied by said contact surface against said cut-off portion and isolating said main frame from said force, said contact surface extending above said V-shaped surface and movable thereacross toward said cutting means.

2. The machine for processing fallen trees into split logs of claim 1 wherein:

said chute includes an inclined supporting surface upon which said fallen tree is restable.

3. The machine for processing fallen trees into split logs of claim 2 and further comprising:

holding means mounted on said frame and positioned adjacent said chute operable to removably hold said fallen tree in position while said saw cuts said fallen tree.

4. The machine for processing fallen trees into split logs of claim 3 wherein:

said holding means includes a toothed member movably mounted to said frame and spring means engaged with said toothed member operable to releasably urge said toothed member into engagement with said fallen tree; and, said saw includes a hydraulically driven cutting edge.

5. The machine for processing fallen trees into split logs of claim 4 and further comprising:

a gate movably mounted to said frame and movable from a closed position whereat said gate closes said entrance which is elevated above ground to an open position whereat said gate extends beneath said entrance providing a tree guide into said entrance.

6. The machine for processing fallen trees into split logs of claim 1 wherein:

said cutting means includes a first straight sharp edge and a second straight sharp edge both pointing toward said ramming means to split said cut-off portion into split logs.

7. The machine for processing fallen trees into split logs of claim 6 wherein:

said first straight sharp edge is located nearer to said ramming means than said second straight sharp edge allowing said first straight sharp edge to engage and initiate a split in said cut-off portion prior to said second straight sharp edge engaging said cut-off portion.

8. The machine for processing fallen trees into split logs of claim 6 wherein:

said first straight sharp edge and said second straight sharp edge cross to form an intersection and are vertically movable on said secondary frame to vertically align said intersection centrally with said cut-off portion, said main frame includes a V-shaped supporting surface to receive said cut-off portion from said ramp to horizontally align said cut-off portion resting thereatop centrally with said intersection.

9. The machine for processing fallen trees into split logs of claim 6 wherein:

said first straight sharp edge and said second straight sharp edge are removably mounted on said secondary frame allowing removal therefrom to facilitate sharpening.

10. A machine for processing fallen trees located remotely therefrom into split logs comprising:

a mobile main frame allowing said main frame to be moved into a forest;

chute means on said main frame to receive a fallen tree;

a winch mounted to said main frame including a cable to removably attach to said fallen tree located remotely from the machine and pull said tree into said chute means;

saw means movably mounted to said main frame and operable to cut off a portion of said fallen tree positioned in said chute means;

a secondary frame mounted atop said mobile main frame, said secondary frame including a plurality of members interconnected together to form rail means;

splitting means operable to receive said cut off portion and split said cut-off portion into split logs and including;

ramming means which includes a power cylinder with an extendable rod and a contact surface located distally on said rod to engage one end of said cut-off portion and to apply horizontal force thereagainst; and, cutting means to engage the opposite end of said cut-off portion;

wherein said contact surface is supported slidably upon said rail means to move to and from said cutting means;

and wherein said cylinder and said cutting means are mounted to said members thereby absorbing said horizontal force applied by said contact surface against said cut-off portion and isolating said main frame from said force.

11. The machine for processing fallen trees into split logs of claim 10 wherein:

said secondary frame further includes a V-shaped supporting surface to receive said cut-off portion to horizontally align said cut-off portion resting thereatop with said cutting means, said cutting means includes a plurality of cutting edges which cross forming an intersection and which are vertically movably mounted to said secondary frame to align said intersection with said cut-off portion.

12. The machine for processing fallen trees into split logs of claim 10 wherein:

said cutting edges include a first sharp edge and a second sharp edge with said first edge located nearer to said ramming means than said second edge allowing said first edge to engage and initiate a split in said cut-off portion prior to said second edge engaging said cut-off portion.

*13. A machine for splitting tree logs comprising:*

*a mobile main frame;*

*a secondary frame mounted atop said mobile main frame, said secondary frame including a plurality of members interconnected together to form rail means;*

*splitting means operable to receive tree logs and split said tree logs and including:*

*ramming means having a power cylinder with an extendable rod and a contact surface located distally on said rod to engage one end of a tree log and apply horizontal force thereagainst; and,*

*cutting means to engage the opposite end of said tree log; and wherein,*

*said contact surface is supported slidably upon said rail means to move to and from said cutting means; and,*

*said cylinder and said cutting means are mounted to said members thereby absorbing said horizontal force applied by said contact surface against said tree log and isolating said main frame from said force.*

*14. A machine for splitting tree logs comprising:*

*frame means including wheels mounted thereto and further including a main frame supported by said wheels upon ground;*

*splitting means mounted on said main frame and operable to receive a tree log and split said tree log and including:*

*cutting means and ramming means with said ramming means being operable to contact one end of said tree log and force the opposite end of said tree log against said cutting means splitting said tree log; and,*

*a secondary frame fixedly mounted on said main frame with said ramming means and said cutting means mounted to said secondary frame which isolates pressures exerted by said ramming means against said cutting means from said main frame; and wherein:*

*said secondary frame includes a plurality of horizontally extending members interconnected together to form a plurality of horizontally extending rails, said ramming means includes a power cylinder with an extendable piston rod and a contact surface located distally on said piston rod to engage one end of said tree log and apply horizontal force thereagainst, said contact surface is supported slidably upon said rails to move to and from said cutting means, said main frame further includes a V-*shaped supporting surface to receive said tree log to horizontally align said tree log resting thereatop with said cutting means, said power cylinder and said cutting means are mounted to said horizontally extending members thereby absorbing said horizontal force applied by said contact surface against said tree log and isolating said main frame from said force, said contact surface extending above said V-*shaped surface and movable thereacross toward said cutting means.*

*15. The machine for splitting tree logs of claim 14 wherein:*

*said cutting means includes a first straight sharp edge and a second straight sharp edge both pointing toward*

*said ramming means, said first straight sharp edge is located nearer to said ramming means than said second straight sharp edge allowing said first straight sharp edge to engage and initiate a split in said log prior to said second straight sharp edge engaging said log, said first straight sharp edge and said second straight sharp edge cross to form an intersection and are vertically movable on said secondary frame to vertically align said intersection centrally with said log, said V-shaped supporting surface aligns said log centrally with said intersection, said first straight sharp edge and said second straight sharp edge are removably mounted on said secondary frame allowing removal therefrom to facilitate sharpening.*

* * * * *

UNITED STATES PATENT AND TRADEMARK OFFICE

CERTIFICATE OF CORRECTION

PATENT NO. : Re. 33,233

DATED : Jun. 12, 1990

INVENTOR(S) : Floyd Freeman

It is certified that error appears in the above-identified patent and that said Letters Patent is hereby corrected as shown below:

In block 64 of the title page please change "Patent No.: 6,854,956" to --Patent No.: 4,685,495--.

In column 8, lines 55 to line 63 please put words not in italics into italics.

Signed and Sealed this

Seventeenth Day of September, 1991

*Attest:*

HARRY F. MANBECK, JR.

*Attesting Officer*

*Commissioner of Patents and Trademarks*